United States Patent [19]

Pressey

[11] Patent Number: 4,584,780

[45] Date of Patent: Apr. 29, 1986

[54] LAYOUT TEMPLATE FOR ELECTRICAL PANEL

[76] Inventor: John R. Pressey, 4600 Spring St., Neptune, N.J. 07753

[21] Appl. No.: 664,404

[22] Filed: Oct. 23, 1984

[51] Int. Cl.[4] .................................... G01B 3/02

[52] U.S. Cl. .................................... 33/563; 33/1 B; 33/189; 33/494

[58] Field of Search .................... 33/1 B, 189, 563, 562, 33/1 C, 494

[56] References Cited

U.S. PATENT DOCUMENTS

| | | | |
|---|---|---|---|
| 1,692,149 | 11/1928 | Castan | 33/563 |
| 2,559,015 | 7/1951 | Graff | 33/1 B |
| 4,461,086 | 7/1984 | Segletes | 33/1 B |

FOREIGN PATENT DOCUMENTS

| | | | |
|---|---|---|---|
| 268259 | 10/1929 | Italy | 33/474 |

*Primary Examiner*—William D. Martin, Jr.
*Attorney, Agent, or Firm*—Harvey B. Jacobson

[57] ABSTRACT

A template for locating and marking the positions for conduits entering an electrical panel and the like comprises a rectangular sheet with a series of holes each spaced at distances from the upper and side edges of the sheet to space the centers of different size conduits from those edges. The template has markings leading from each hole to the upper edge at positions indicating the edges of the respective conduits opposite the side edge of the sheet, and the sheet has a ruler scale along the side edge. The template is used for the step-by-step marking of successive conduit locations on a panel using the respective holes and markings in conjunction with a datum line on the panel.

7 Claims, 2 Drawing Figures

LAYOUT TEMPLATE FOR ELECTRICAL PANEL

BACKGROUND OF THE INVENTION

This invention relates to a template useful, for example, in laying out the entrances for electrical conduits into an electrical panel, junction box, or the like.

Electrical conduits leading into an electrical panel or the like may vary in diameter, and if the entrances for such conduits into the panel are to be laid out in an organized and efficient manner, the task of arranging such a layout may take an electrician up to a half an hour or more. The present invention provides a template and method of using same which, by contrast, allows a comparable layout job to be accomplished in a matter of minutes.

STATEMENT OF PRIOR ART

The following U.S. patents disclose various set-up tools, templates, drafting instruments and the like which are constructed for particular uses to facilitate installation of various devices. However, none of the patents discloses a template capable of functioning in the manner of the present invention, nor do any of the patents disclose the manner of using a template in accordance with the invention.

U.S. Pat. No. 2,407,368
U.S. Pat. No. 2,637,110
U.S. Pat. No. 3,195,233
U.S. Pat. No. 3,336,672
U.S. Pat. No. 3,775,857
U.S. Pat. No. 4,064,728
U.S. Pat. No. 4,263,717

SUMMARY OF THE INVENTION

The invention provides a template for laying out electrical conduit entrances to an electrical panel or the like, the template comprising a sheet of suitable material such as metal, plastic, fiberboard or the like, having a pair of orthogonally disposed straight edges, a plurality of small openings in the sheet spaced at different distances respectively from the respective straight edges for marking the centers of different diameter conduits, the spacing of each opening from the respective edges being related to the diameter of the respective conduit, so as to space the center of the conduit a suitable distance from a line on which the respective edge of the sheet is placed, and the sheet having marks along one of said edges related to the respective openings for indicating distances to which the outer diameters of the respective conduits will extend in one direction from their respective centers. The other of said edges of the sheet may be marked as a ruler.

In laying out an electrical panel using a template in accordance with the invention, a datum line parallel to the top of the panel may, for example, be chosen from which the centers of the conduits are to be spaced, and the template is then used step-by-step from one side of the panel to mark off the centers of successive conduits, with a measured spacing therebetween, the successive steps comprising positioning the template with said one of the edges along the datum line and the other edge at a position on the datum line a selected distance from one side of the panel, marking the center of a first conduit through the opening in the template representing a conduit of requisite diameter, marking the position on the datum line corresponding to the mark to where the outer diameter of the first conduit will extend, measuring a suitable location along the datum line from said marking for the outside of a second conduit, moving the template along the datum line until said other edge aligns with said location, marking the center of the second conduit through the opening in the template representing the requisite diameter conduit, and, as required, repeating the measuring, template moving, and marking steps along the datum line for successive conduits.

One surface of the template may, for example, be marked for use in proceeding through the above steps from the right hand side to the left hand side of a panel, and the other surface of the template may be a mirror image of the one surface for use in marking a panel from left to right.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
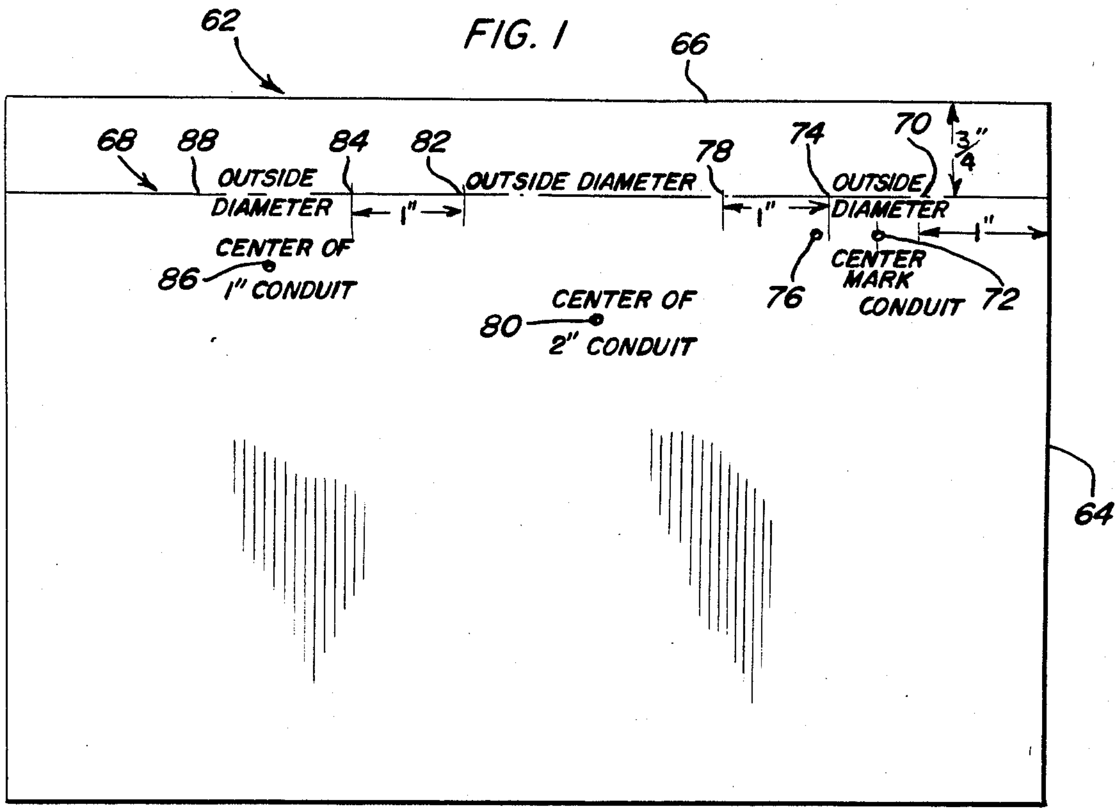
FIG. 1 is a diagrammatic elevational view of a surface of an electrical panel illustrating a manner in which it may be marked with a template in accordance with the invention, for laying out suitable entry positions for electrical conduits.
Figure 2:
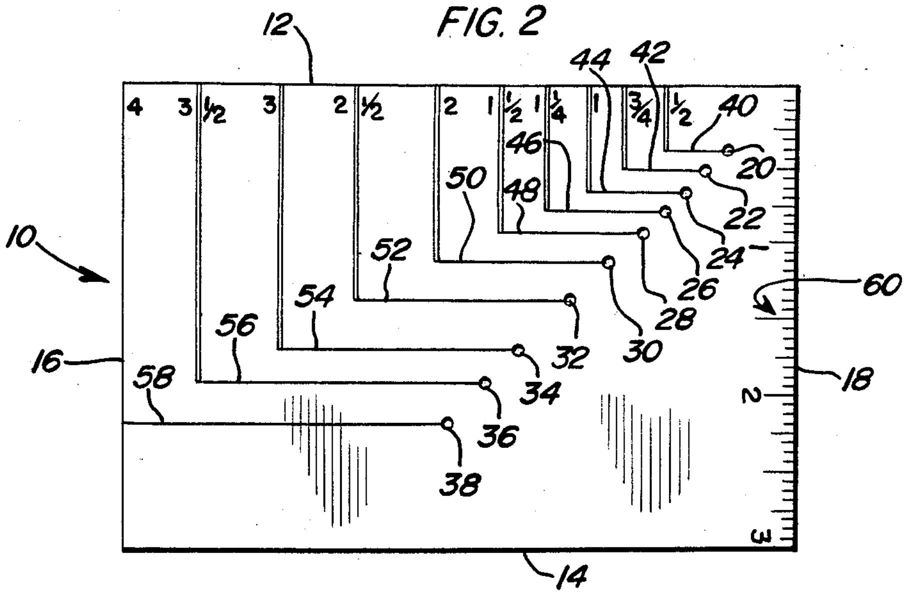
FIG. 2 is an elevational view of one surface of a layout template in accordance with the invention.

It is to be understood that the drawings are not to scale either in the absolute sense, or relatively as between FIGS. 1 and 2.

DESCRIPTION OF PREFERRED EMBODIMENT

Referring initially to FIG. 2, there is illustrated a rectangular template 10 of suitable sheet material, such as metal, plastic, cardboard or the like, the template in the illustrated embodiment being 4½ inches long and 3 inches wide having linear upper, lower and side edges 12, 14, 16, 18.

The template is provided with a series of holes 20–38 for marking the centers respectively of conduits of different diameter, as will be described, each hole being, for example, about ⅛ inch diameter. Further, the visible surface of the template has a series of right angled markings 40–58 leading from the respective holes along the surface of the template away from edge 18 and up to edge 12, to represent on edge 12, the points to which the outside diameters of the respective, conduits extend to the left of the respective centers. A ruler scale 60, which may measure in sixteenths of an inch, is provided along edge 18.

The illustrated surface of the template is used for laying out conduit positions, for example on an electrical panel 62 (FIG. 1) starting from the right side 64 of the panel and working toward the left, as will be described. The opposite surface of the template (not shown in the drawings) may be marked as a mirror image to the illustrated surface, with a scale like ruler scale 60 along edge 18, and markings corresponding to markings 40–58. The opposite surface of the template may be used for laying out conduit positions on the electrical panel starting from the left and working to the right.

Each of the holes 20–38 and the associated markings 40–58 are respectively designated by the internal diameters of the conduits they represent. Thus, hole 20 and marking 40 has the designation "$\frac{1}{2}$" as indicated, adjacent the marking to designate a half inch I.D. conduit, and likewise for the remaining holes and markings up to a four inch I.D. conduit represented by hole 38 and marking 58 (which is at edge 16 of the template). Also, each of the holes 20–38 is spaced both from edge 12 and from edge 18 by an amount corresponding to the radius of the particular conduit plus its wall thickness. Thus, hole 20 for example, representing a one half inch I.D. conduit is $\frac{1}{2}$ inch in from edge 18 and $\frac{1}{2}$ inch down from edge 12 ($\frac{1}{4}$" for the radius and $\frac{1}{4}$" for the wall thickness in each case). Similarly, hole 38 representing a 4" I.D. conduit is $2\frac{1}{4}$"in from edge 18 and $2\frac{1}{4}$" down from edge 12 (2" for the radius and $\frac{1}{4}$" for the wall thickness in each case). Similarly, the vertical portion of each of the markings 40–58 leading up to edge 12 is spaced a distance to the left of its respective hole 20–38 by an amount equivalent to the inside radius of the respective conduit plus the wall thickness. Thus, the distance to the left of hole 20 of the vertical portion of marking 40 is also $\frac{1}{2}$" ($\frac{1}{4}$" plus $\frac{1}{4}$") and the distance to the left of hole 38 of the vertical portion of marking 58 is also $2\frac{1}{4}$"(2" plus $\frac{1}{4}$").

It will be appreciated that the above measurements are given by way of example only and may be varied to suit different conduit diameters and wall thicknesses.

In laying out the electrical panel using the template, first a distance from the top edge 66 of the panel is chosen at which the tops of the respective conduits will be located and a datum line 68 is drawn along the panel at this distance parallel to edge 66. In the illustrated example, the distance of line 68 from edge 66 is $\frac{3}{4}$". Next, the distance in from right edge 64 of the panel is chosen for the right edge of the first conduit, and a mark 70 is made on line 68 at this point (1" from edge 64 in the illustrated example). Then, the template 10 is placed on the surface of the panel with edge 12 of the template along line 68 and edge 18 of the template at mark 70. A mark 72 is formed on the panel through one of the holes 20–38 corresponding to the I.D. of the first conduit, to indicate the center of the first conduit, and another mark 74 is made on line 68 where it is met by that one of the markings 40–58 of the template leading from the respective hole to indicate the distance from its center to which the left edge of the first conduit will extend. In the illustrated example, the first conduit is a $\frac{1}{2}$" diameter conduit so that hole 20 and marking 38 of the template are used. (If cross-hairs are required on the panel to indicate the conduit center, the template can be used be used to provide a horizontal hair line by making a second mark 76 through hole 20 displaced from mark 72 and, to provide a vertial hair line using the template as a square from line 68.)

After the center of the first conduit and its left edge have been located by marks 72 and 74, the second conduit can be positioned and marked in similar manner, first measuring a suitable distance (e.g. 1") along line 68 for spacing the right edge of the second conduit from the left edge of the first conduit, making a mark 78 at this point, and using mark 78 to position the edge 18 of the template for marking the center 80 and left termination 82 of the second conduit as previously (the second conduit being in this case a 2" diameter conduit). The procedure may then be repeated to make marks 84, 86 and 88 for the right edge, center, and left edge of a third conduit (a 1" diameter conduit as illustrated) and so forth.

It will be understood that the above procedure can be repeated for further conduit rows, and can equally well be effected with the reverse side of the template commencing from the left side of the electrical panel. The procedure is simple, effective, and more rapidly carried out than taking manual measurements for each conduit. Further, templates in accordance with the invention can be economically manufactured from readily available materials and using conventional manufacturing techniques.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A template for laying out electrical conduit positions on an electrical panel and the like comprising a sheet formed with a pair of orthogonally disposed straight edges, a plurality of openings formed through the sheet at different distances from said edges respectively for marking the centers of different size conduits, the spacing of each opening from the respective edges being related to a particular conduit size so as to space the center of the conduit a suitable distance from lines along which the respective edges of the sheet are placed, and indicia on one surface of the sheet identifying the size of conduits designated by the respective openings, wherein each opening is spaced from each of said edges by an amount corresponding to half the inside dimension of the conduit it designates plus the conduit wall thickness, and wherein the template further includes a marking on said surface of the sheet along one of said edges for each of said openings, each marking being spaced from the respective opening by an amount corresponding to half of the inside dimension of the conduit which the opening designates plus the wall thickness of the conduit.

2. The invention of claim 1 wherein the markings comprises right angled markings extending from the respective openings.

3. The invention of claim 1 wherein said surface of the sheet is provided with a ruler scale along the other of said edges.

4. The invention of claim 3 wherein the indicia, markings and scale are replicated on the other surface of the sheet to provide a template of opposite hand.

5. A layout template for locating and marking the positions of electrical conduits on an electrical panel and the like comprising a rectangular sheet having an upper edge and a side edge, a plurality of holes formed through the sheet to represent the centers of different diameter conduits respectively, each hole being spaced from the side edge and the upper edge by an amount corresponding to the inside radius of a respective conduit plus the conduit wall thickness, markings leading from the respective holes to points on the upper edge of the sheet each spaced from the respective hole by an amount corresponding to the inside radius of the respective conduit plus the conduit wall thickness, and indicia on the sheet correlating the respective holes, markings, and conduits by size of conduit.

6. The invention of claim 5 including a ruler scale formed along the side edge of the sheet.

7. A method of locating and marking the positions for electrical conduits on an electrical panel and the like comprising the steps of; (a) providing a layout template comprising a sheet having mutually orthogonal straight upper and side edges, holes formed through the sheet for marking the centers of different size conduits, the holes being located at positions which are spaced from the respective edges of the sheet by distances related to the sizes of the different conduits, markings along the upper edge correlated with the respective holes for marking the edges of the respective conduits opposite the side edge of the sheet, and indicia identifying the respective holes and markings in terms of the conduit diameters; (b) providing a datum line on the panel and the like for the tops of the conduits; (c) providing a point on the datum line spaced from one edge of the panel and the like for the edge of a first conduit; (d) positioning the template on the panel with the upper edge of the template along the datum line and the side edge at said point; (e) marking the center of the first conduit through the respective hole in the template corresponding to the required conduit diameter, and marking a further point on the datum line corresponding to the position of the marking along the upper edge of the template correlated with said respective hole; (f) providing another point on the datum line spaced from said further point by a distance suitable for positioning the edge of a second conduit; (g) repositioning the template on the panel and the like with the upper edge of the template along the datum line and the side edge of the template at said another point, and (h) marking the center of the second conduit through a separate hole in the template corresponding to the required conduit diameter.

* * * * *